US006999105B2

(12) United States Patent
Buerkle et al.

(10) Patent No.: US 6,999,105 B2
(45) Date of Patent: Feb. 14, 2006

(54) IMAGE SCALING EMPLOYING HORIZONTAL PARTITIONING

(75) Inventors: Daniel Joseph Buerkle, Cincinnatus, NY (US); David Allen Hrusecky, Cedar Park, TX (US); Charles Francis Marino, Round Rock, TX (US); Chuck Hong Ngai, Endwell, NY (US); John William Urda, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 10/728,347

(22) Filed: Dec. 4, 2003

(65) Prior Publication Data

US 2005/0122347 A1 Jun. 9, 2005

(51) Int. Cl.
*G09G 5/00* (2006.01)
*G09G 5/36* (2006.01)

(52) U.S. Cl. ...................................... 345/660; 345/560

(58) Field of Classification Search ................ 345/660, 345/667, 671, 619, 560
See application file for complete search history.

(56) References Cited

U.S. PATENT DOCUMENTS

| | | | | |
|---|---|---|---|---|
| 5,764,238 A * | 6/1998 | Lum et al. | .................. | 345/660 |
| 5,771,105 A * | 6/1998 | Rust et al. | ................. | 358/2.99 |
| 6,141,017 A * | 10/2000 | Cubillo et al. | .............. | 345/660 |
| 6,348,929 B1 * | 2/2002 | Acharya et al. | ............ | 345/660 |
| 6,501,441 B1 | 12/2002 | Ludtke et al. | | |
| 6,710,784 B1 * | 3/2004 | Piazza | ........................ | 345/660 |
| 2001/0028407 A1 * | 10/2001 | Joo | ........................... | 348/453 |
| 2002/0154123 A1 * | 10/2002 | Harasimiuk | ................. | 345/472 |
| 2003/0039409 A1 * | 2/2003 | Ueda | .......................... | 382/298 |
| 2003/0174148 A1 * | 9/2003 | Chia et al. | .................. | 345/660 |

* cited by examiner

*Primary Examiner*—Ryan Yang
(74) *Attorney, Agent, or Firm*—Wood, Herron & Evans, LLP

(57) ABSTRACT

An apparatus, circuit arrangement, program product and method of scaling an image horizontally partition a source image into a plurality of partitions, with each partition having a width that is no greater than the width of a line buffer used to scale the image. By partitioning an image into a plurality of partitions, the overall width of the scaled image is not constrained by the width of the line buffer. As a result, in many instances line buffers that are significantly smaller than conventional full-width line buffers may be used to generate scaled images that are substantially wider than may be generated by conventional buffers. Moreover, when implemented in hardware, the line buffers typically occupy significantly less real estate on an integrated circuit, thus reducing both cost and power consumption.

23 Claims, 6 Drawing Sheets

FIG. 8
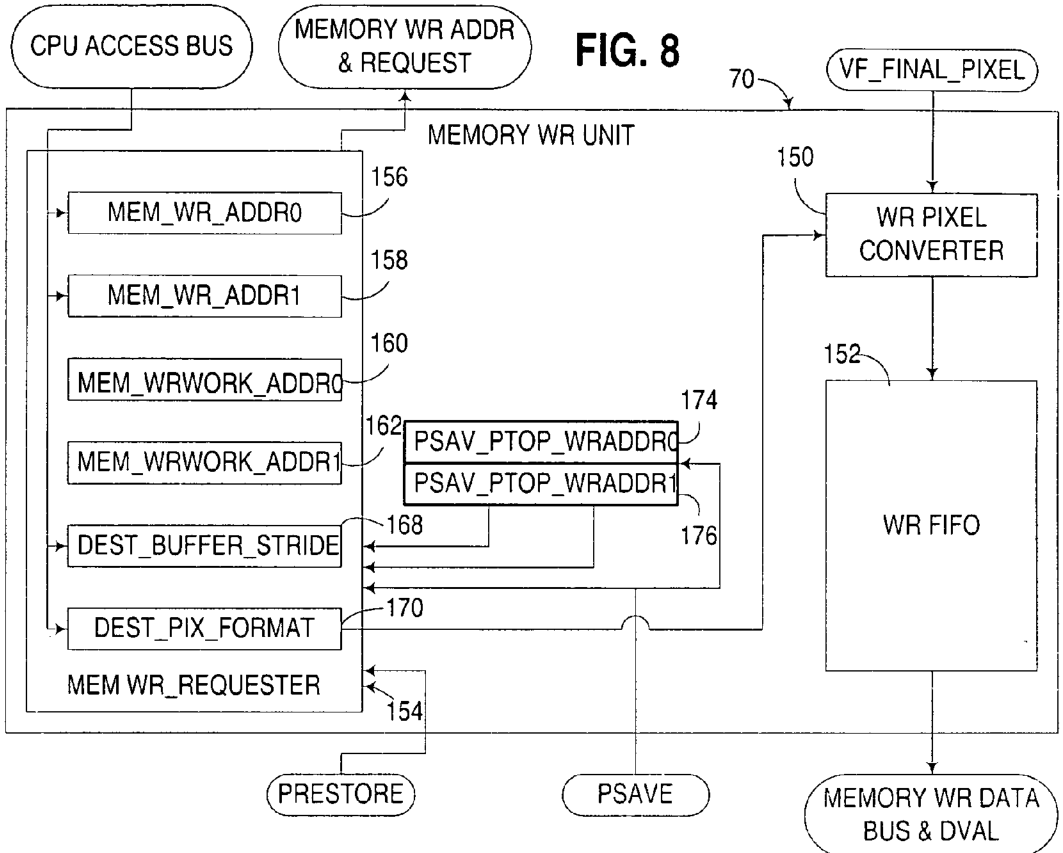
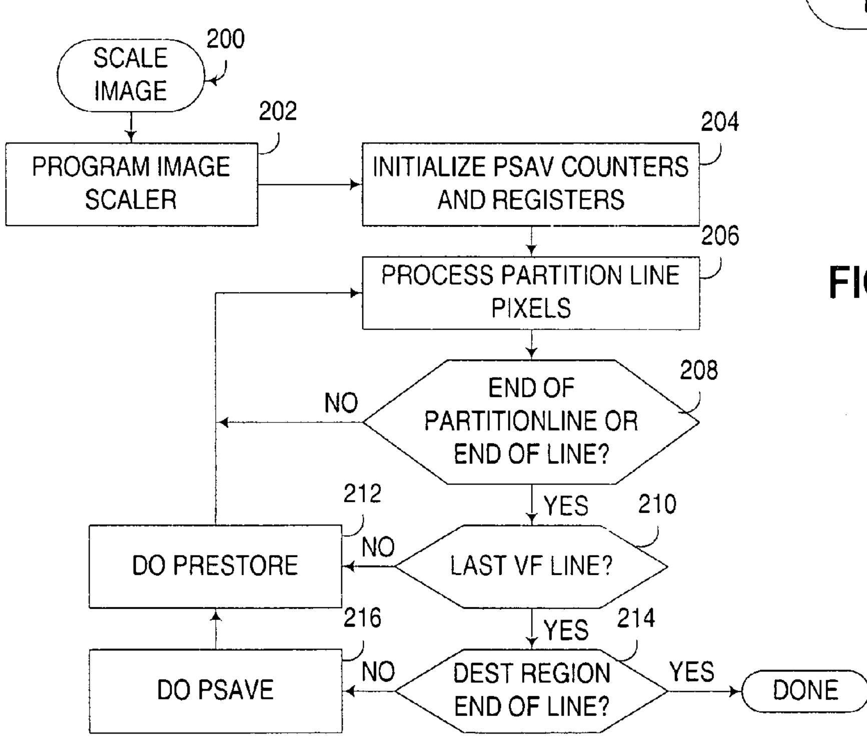
FIG. 9

IMAGE SCALING EMPLOYING HORIZONTAL PARTITIONING

FIELD OF THE INVENTION

The invention relates to graphical image processing, and in particular, to graphical image scaling.

BACKGROUND OF THE INVENTION

Graphics capabilities are commonly implemented in a number of electronic devices. Single-user computers such as desktop computers, laptop computers, handheld computers, and the like often use graphical displays for interacting with a user. Also, many digital video consumer electronics products, such as those for digital television, set-top box, and DVD applications, often use computer graphics capabilities to both display video streams and generate overlays, windows, menus and other displayable controls. Many consumer electronics products also provide graphic user interfaces (GUI's) much like those of personal computers, requiring the rendering of graphic lines, complex geometric shapes, and a multitude of colors and pixel formats, while also possibly being used for video resizing and display. Furthermore, some products may need to concurrently display multiple graphical components, e.g., various combinations of full-motion video display windows, internet session windows, GUTI and background graphic objects, windows, and/or digital images.

To generate complex displays, a number of different image processing techniques are often required. For example, image scaling, which expands or reduces the size of a graphic image, is often required to scale a display, or sometimes a region or individual graphic element on a display.

Many image processing techniques, such as image scaling, can be implemented entirely in software. The significant processing overhead associated with providing such graphics functionality such as image scaling, however, can often place a significant burden on the Central Processing Unit's (CPU's) of many electronic devices, as well as their memory subsystems and associated bus performance. In such instances, it may be desirable to off-load some or all of the graphics functionality required in a particular electronic device to a dedicated special-purpose graphics controller.

A graphics controller is typically a separate integrated circuit from a CPU, with special hardware incorporated into the circuit to assist a CPU in performing specialized graphics functions and operations. Among other functionality, a graphic controller often incorporates image scaling functionality to facilitate resizing images without overly taxing the CPU.

An image scaler is typically configured to expand or reduce the size of a two dimensional source image. In a conventional image scaler, a source image is fetched, operated on as desired for expansion or reduction, and stored as a resultant destination image. While some image scalers may provide only a fixed amount of scaling, more generalized image scalers are able to provide variable scaling based upon parameters supplied by a CPU. In addition, often the amount of expansion or reduction in the horizontal dimension can be separate and independent from that in the vertical dimension. Furthermore, in some instances no expansion or reduction may be performed in either or both dimensions, thus leaving the source data in one or both dimension(s) unchanged when stored to the destination image.

Typical image scalers employ fractional image scaling, where the amount of expansion or reduction in a given dimension is defined by a "Scale Factor", which is mathematically defined to be the ratio of destination image size (in units of "number of pixels") to the source image size (also in number of pixels), e.g., in terms of L/M, where L is the destination image size, and M is the source image size. The scale factor is usually expressed in a fraction or decimal number value. For example, in the horizontal dimension, for a source image that is 800 pixels wide, and where the destination image is scaled down to 640 pixels, then the horizontal scale factor may be represented as $L_H/M_H=640/800=0.8=4/5$. The vertical scale factor is typically defined in the same manner, but using source and destination image dimensions in the vertical direction.

A number of techniques have been developed to accomplish fractional image scaling. For example, some image scalers employ simple pixel dropping and duplication (or oversampling), for reduction and expansion, respectively. In the vertical dimension this is often referred to as line dropping and line duplication. In most instances, however, this method provides relatively crude and low quality results.

Another technique, interpolation filtering, multiplies input pixels to a filter by coefficients that are solely dependent upon the instantaneous position of the filter while processing the full source image pixel stream. With this technique, the exact position may fall between two input pixel locations at times. Interpolation filters have two or more inputs, and the sum of the coefficients is always one.

Yet another technique is symmetrical linear filtering, where the input pixels to the filter are also multiplied by coefficients that are fixed for a given range of scale factors. These filters usually possess an odd number of inputs (and hence an odd number of coefficients), and the coefficients are weighted to emphasize the center input pixel as the most prominent, such that the coefficients decrease on either side of the center input, or tap, in a linear and symmetrical fashion (i.e., straight line and mirror image). As with interpolation filtering, the sum of the coefficients is one.

Other techniques and algorithms for image scaling, exist, and combinations of these techniques may be used in some designs to provide better results than using any one technique alone.

A conventional image scaler typically employs several functional units that cooperate to provide image scaling functionality. A source image memory read unit is typically used to retrieve source image data and provide the data to a horizontal filter unit, which operates on the source image data to expand or reduce the data in a horizontal direction based upon the desired horizontal scaling factor. The horizontal filter unit then outputs horizontally-scaled data to a vertical filter unit to expand or reduce the data in a vertical direction based upon the desired vertical scaling factor. The vertical filter unit then outputs the data to a destination image memory write unit, which stores the data as destination image data. In some image scaler designs, an additional unit, an edge enhancement unit, may also be used to improve image quality when using relatively large scale factors. In addition, the memory read and/or write units may be configured to convert image data to different pixel formats, e.g., RGB32, RGB16, YCbCr, LUT8, etc.

Additional front end processing methods may also be used in some designs for larger expansion scale factors to reduce the "staircase" effects on angled and curved feature boundaries in images during expansions. These methods are typically applied ahead of any horizontal and vertical filtering. One such method is to factor out power-of-2 duplication factors from the horizontal and/or vertical scale factors, duplicate pixels and/or lines based on these new factors, and apply a selective directional filter for smoothing over an area (typically using un-weighted or weighted area sampling).

The horizontal and vertical filter units of an image scaler typically employ dedicated special purpose digital filters with associated multiply-add-normalize arithmetic elements to perform low-pass filtering. In addition, the image scaling mechanism for the horizontal dimension generally employs separate filter circuitry from that of the vertical dimension. These digital filters use multiple inputs consisting of adjacent and/or nearby pixels, either horizontally in one single line, or vertically spanning more than one line but from the same horizontal pixel location in each of those lines.

High performance hardware image scalers typically fetch pixel data from memory only once, thereby increasing image scaler processing speed (throughput) and reducing the memory subsystem and bus loading on the rest of the system. For the horizontal filter arithmetic elements, multiple horizontally adjacent or nearby inputs are needed simultaneously, and these are supplied via local registered buffering of data fetched sequentially from memory. In most designs, horizontally adjacent pixels of a source image occupy sequentially contiguous memory locations, and as such, source image data may often be retrieved sequentially from memory in bursts via the memory read unit, locally buffered in a first-in/first-out (FIFO) buffer, and supplied as needed to input registers in the horizontal filter unit.

Also in most designs, lines of source image data are arranged sequentially in memory, starting at the top line of the source image. As such, image data is typically read in from top to bottom, with the image data on each line supplied sequentially. The horizontal filter unit then processes the retrieved data to expand or reduce the number of pixels in each line. The resultant output pixel data from the horizontal filter unit, however, is of an intermediate result nature, and must be provided to the vertical filter unit to generate the final destination image pixels by combining the results for each line with the horizontal filter intermediate results from previous lines.

For the vertical filter unit arithmetic elements, multiple input pixel values are needed simultaneously from adjacent or nearby vertical positions (yet at the same horizontal position) to generate the final image scaler output pixel values that constitute the destination image. As a result, local buffering is typically required in the vertical filter unit to store the intermediate results generated by the horizontal filter unit. The buffered intermediate results typically take the format of multiple lines of source image data that has been expanded or reduced by the desired horizontal scaling factor.

Local buffering in the vertical dimension typically entails using line buffers to store entire horizontal lines of intermediate results from vertical image positions above the current line under operation. The vertical filter unit uses these line buffers to provide intermediate results from previous lines yet at the current intermediate image horizontal position as inputs along with the current intermediate results from the horizontal filter unit. For vertical filter units with n inputs or "taps", typically n−1 line buffers are needed.

One limitation found with conventional image scaler designs, however, is that the horizontal size of a destination image is inherently limited by the size of the line buffers used in the vertical filter unit, as each line buffer is required to store all of the horizontally expanded/reduced data for a given line as output by the horizontal filter unit.

For higher resolution displays, e.g., with line widths of 1920 pixels or more, and with higher color depths, the memory requirements of "full-width" line buffers in a vertical filter unit can be substantial. Large line buffers often require a significant amount of circuitry, which occupies valuable real estate on an integrated circuit, and often results in increased chip size and cost. Also, for graphic controllers intended for use in power-sensitive designs (e.g., in battery powered electronic devices), the circuitry required to implement full-width line buffers often adds to the overall power consumption of the chip.

Furthermore, given the continually-increasing improvements in graphic and display technologies, display resolutions continue to increase, and thus require larger full-width line buffers to support the higher resolution displays. Increasing the size of the full-width line buffers in a vertical filter unit, however, adds additional circuitry to the design, thus further increasing chip size, cost and power consumption.

Therefore, a significant need has arisen for an image scaler design that avoids the limitations and drawbacks presented by the use of full-width line buffers in a vertical filter unit.

SUMMARY OF THE INVENTION

The invention addresses these and other problems associated with the prior art by providing an apparatus, circuit arrangement, program product and method of scaling an image that horizontally partition a source image into a plurality of partitions, with each partition having a width that is no greater than the width of a line buffer used to scale the image. By partitioning an image into a plurality of partitions, the overall width of the scaled image is not constrained by the width of the line buffer. As a result, in many instances line buffers that are significantly smaller than conventional full-width line buffers may be used to generate scaled images that are substantially wider than may be generated by conventional buffers. Moreover, when implemented in hardware, the line buffers typically occupy significantly less real estate on an integrated circuit, thus reducing both cost and power consumption.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 8 is a block diagram of the memory write unit referenced in FIG. 4.

FIG. 9 is a flowchart illustrating the steps in a scale image routine executed by the graphics controller of FIG. 3.

DETAILED DESCRIPTION

Figure 1:
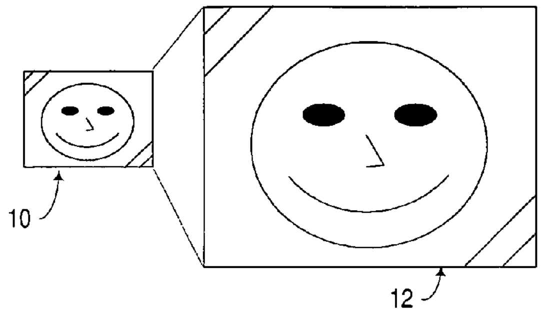
FIG. 1 is a block diagram illustrating an exemplary scaling operation performed on a source image.

The embodiments discussed below employ horizontal partitioning of a graphic image during image scaling. The horizontal partitioning of the graphic image results in the partitioning of the graphic image into a plurality of "tiles" or "partitions", each of which being limited in width. Typically, the partitions are not so limited vertically, and may extend for the full height of an image. In other embodiments, however, it may also be desirable to vertically partition an image.

By horizontally partitioning a graphic image, the line buffers used in vertical filtering need only be as wide as the width of each partition after horizontal scaling (should any such scaling be performed prior to vertical filtering). The number of partitions, however, is typically not constrained, so the overall width of an image after scaling is often unlimited. Various widths of line buffers may be used depending upon factors such as chip area, power budget, cost constraints, performance concerns, and memory burst characteristics. For example, it many environments it is beneficial for a line buffer to be 512 pixels wide or smaller, e.g., a width of 64, 128, 256 or 512 pixels.

The discussion hereinafter refers to the width of an image in terms of a horizontal direction, and the height of the image in terms of a vertical direction. In addition, the discussion focuses on implementations where image data is arranged into vertically stacked lines, with each line representing a string of horizontally-arranged pixels, and with the pixel data for each line immediately following the pixel data for the preceding line in memory, such that an image scaler retrieves the image data line by line, top to bottom, and with the image data in each line read left to right, which is consistent with the typical manner in which image data is stored in memory. It will be appreciated, however, that image data may be stored in memory in other arrangements, e.g., with image data for a line stored in right to left manner and/or with lines arranged in a bottom to top manner.

Furthermore, image data may alternately be arranged in memory using horizontally stacked lines, with each line representing a string of vertically-arranged pixels. In such instances, a line buffer would store vertically-arranged pixels, rather than horizontally-arranged pixels. As such, it will be appreciated by one of ordinary skill in the art that the use of the terms "horizontal" and "vertical" is merely in keeping with conventional image processing nomenclature. More specifically, the terms "horizontal" and "width" are typically representative of the direction of the pixel data stored in a line buffer, while the term "vertical" is representative of a direction orthogonal to that of the data stored in the line buffer. In this regard, horizontal scaling of line of pixel data in this arrangement may also be referred to herein as longitudinal scaling. The invention, however, is not limited to any particular orientation of an image being scaled, whether from a display or in-memory perspective.

Figure 2:
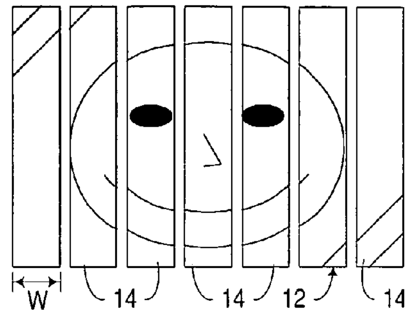
FIG. 2 is a block diagram illustrating a partitioning of the source image of FIG. 1 in connection with an image scaling operation consistent with the invention.

Turning now to the Drawings, wherein like numbers denote like parts throughout the several views, FIG. 1 illustrates an exemplary source image 10, for which it may be desirable to scale (in this case, to expand) into a destination image 12. Consistent with the invention, and as shown in FIG. 2, destination image 12 may be partitioned during image scaling into a plurality of tiles or partitions 14, with each tile or partition having a width W. As noted above, in the illustrated embodiment, it is desirable for the width W of each partition to be no greater than the width of a line buffer utilized in scaling the partition. Typically, this width relates to the width of the partition after horizontal scaling, although in other embodiments, horizontal scaling may be performed after vertical scaling, and as such, the width of the partition prior to horizontal scaling may be taken into account when selecting an appropriate line buffer and partition width.

Figure 3:
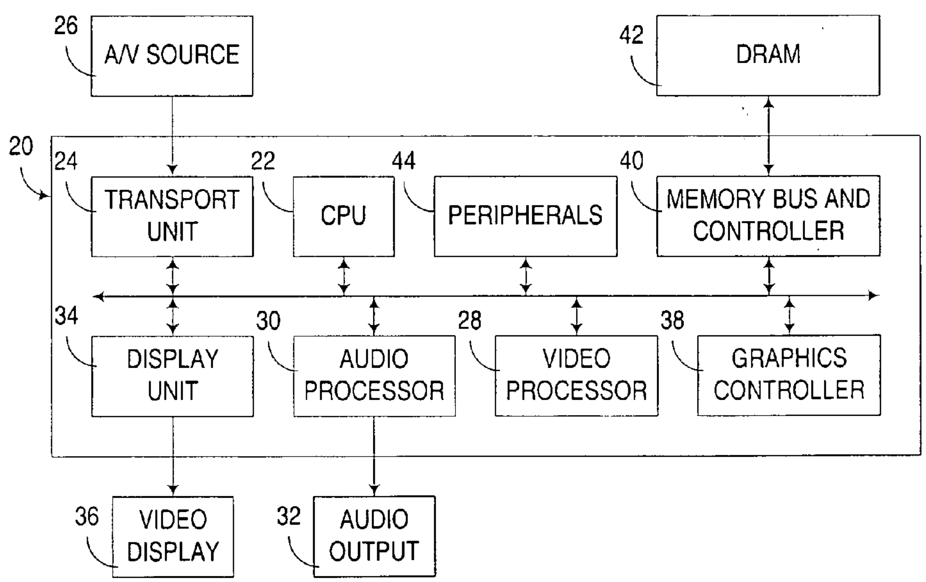
FIG. 3 is a block diagram of an apparatus incorporating a graphics controller implementing partitioned image scaling functionality consistent with the invention.

Next, a typical digital video consumer electronics device 20, incorporating the image scaling functionality described herein, is shown in FIG. 3. Device 20 may be, for example, a DVD player or recorder, a satellite receiver, a cable receiver, a set top box, or other digital video device. Device 20 includes a CPU 22, which executes the operating system, application programs, and control and configuration routines for the other units in device 20. A transport unit 24 is used as the main input interface for compressed digital A/V data from an A/V source 26, and usually has the ability to demultiplex transport stream and/or program stream data packets.

A video processor 28 may be a multi-stage video decompression subsystem consisting of a collection of pipelined data processors and digital signal processors (DSP), which is used to decompress the video data in the transport stream. Likewise, an audio processor 30 may be a multi-stage audio decompression subsystem based on a DSP, which outputs digital audio data to DAC (Digital-to-Analog Converter) device(s) or analog audio signals to an audio output 32.

A display unit 34 combines all digital video/image/display data and provides final digital video data to DENC's (Digital Encoders), which generally drive video DAC's that ultimately output data to a video display 36. A memory and bus controller 40 provides an external interface to a main system memory 42 (i.e., Dynamic Random Access Memory, or DRAM), and other external memory.

A graphics controller 38 accelerates operations on graphics image data using special purpose image processing techniques and hardware. Among other functionality, graphics controller 38 incorporates a graphical image scaler utilizing partitioned image scaling consistent with the invention. Additional components, e.g., peripherals 44, may also be included to provide a multitude of input/output functions.

The basic data flow of device 20 is as follows: packetized compressed video is typically received by transport unit 24, e.g., from a satellite receivers or network interface. Transport unit 24 separates the compressed audio and compressed video data streams and writes this data into separate memory buffers. Video processor 28 reads the compressed video data from its respective memory buffer and operates on it, possibly combining this with previously decompressed video control/frame/image/buffer data, and finally writes this decompressed video image data to memory areas called video "frame buffers". Audio processor 30 performs similar operations on the compressed audio data, writing the final decompressed digital audio data streams to audio output buffers. Audio processor 30 then reads this audio output data from memory and sends it in collect format to Audio DAC or other digital audio device(s). Graphics controller 38 generates and operates on digitized image data, reading source data from predefined memory buffers and writing resultant image data to output memory buffers. Display unit 34 outputs the final video screen data to the raster display controller.

Digital video consumer electronic device 20 may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Moreover, it will be appreciated that all or portions of an partitioned image scaling operation consistent with the invention may be implemented in software, rather than in hardware. In this regard, program code implementing such portions of an image scaling operation may be read and executed by one or more processors in a computer or other programmable electronic device to cause that device to perform steps necessary to execute steps or elements embodying the various aspects of the invention. Such program code may be distributed as a program product in a variety of forms, whereby the program code is borne on a computer readable signal bearing medium.

Figure 4:
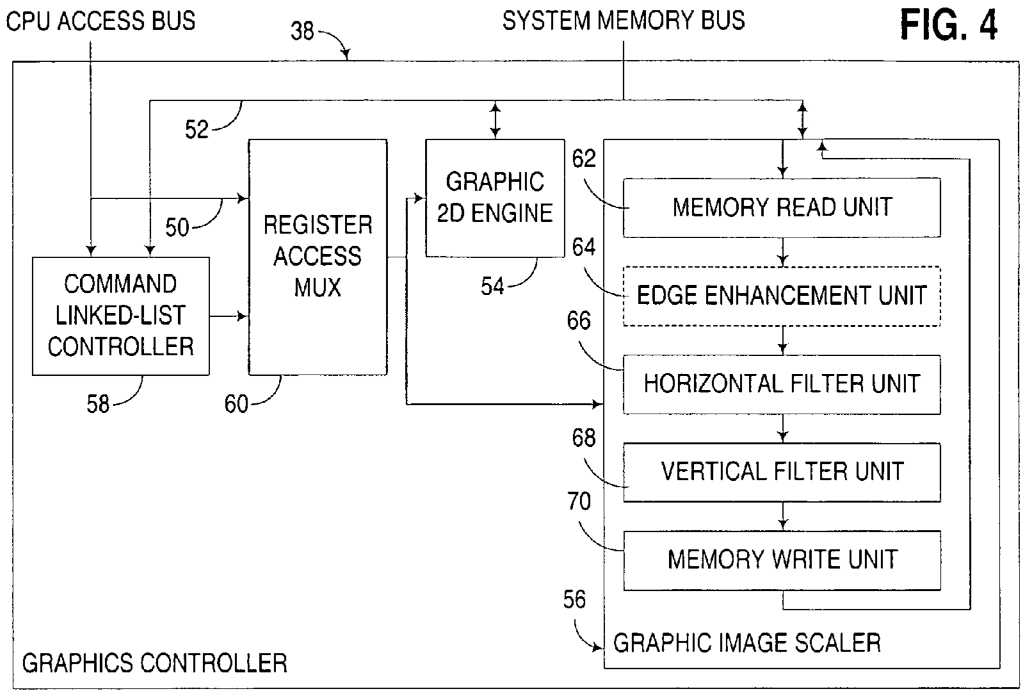
FIG. 4 is a block diagram of the graphics controller referenced in FIG. 3.

Now turning to FIG. 4, an exemplary implementation of graphics controller 38 is illustrated in greater detail. Controller 38 includes connectivity to a CPU access bus 50, used for programming of the graphics controller by CPU 22, and a system memory bus 52, used for data transfer to and from the memory. Controller 38 includes a graphic 2D (two-dimensional) engine that performs various graphical functions on image data. Furthermore, controller 38 includes a graphic image scaler 56 incorporating partitioned image scaling consistent with the invention.

Graphics controller 38 is responsive to commands generated by CPU 22, which are stored and processed sequentially by a command linked-list controller 58. A register access multiplexer 60 is used to permit CPU 22 to program various configuration registers in engine 54 and graphic image scaler 56. Among other commands, a "scale task" may be supported, to initiate a scaling operation by the graphic image scaler from a full source region in memory to the final destination region output to memory. A scale task is typically accomplished with setup and programming help from application software running on the CPU. There are generally two phases for each scale task: 1) software loads source image, and preprograms the graphic image scaler's CPU Programmable Registers; and 2) the scaler performs the scale operation, typically in response to the software setting a start/busy bit in a control register in the scaler.

The overall command-driven architecture of graphics controller 38 is well known in the art. It will be appreciated, however, that a number of other graphics controller architectures may also be used in the alternative.

Graphic image scaler 56 generally includes a memory read unit 62, an edge enhancement unit 64, a horizontal filter unit 66, a vertical filter unit 68 and a memory write unit 70. Units 62 and 70 are typically configured with DMA capabilities, while units 66 and 68 are typically, but not necessarily, implemented separately to provide scaling in two orthogonal directions. Unit 64 is optional, and may be omitted from some image scaler designs (including the design illustrated in FIGS. 5–8).

Graphic image scaler 56 in the illustrated implementation operates on image data assumed to be stored in memory and files in a consistent manner, with images and regions (portions) of images being generally rectangular in shape (i.e., the number of pixels per line is equal for all lines in a given image). It is also assumed that the upper left corner of an image is the starting location in memory. Proceeding from left to right in the first horizontal line of pixels, subsequent pixels occupy sequentially increasing address locations in memory. While numerous different data formats may be used for stored pixel data, the width (i.e., number of bits or bytes) of each pixel stored in a given image is typically the same, and may range from 1 bit per pixel to multiple bytes per pixel. When the end of a line is reached, the leftmost (beginning) pixel of the next line generally occupies the next increasing address location from the last pixel at that end of the line. As referred to hereinafter, the length of each line of an image, in number of bytes, is referred to as the "stride" of the image. Moreover, the memory spaces defined for storing images in a graphics system are typically referred to as frame buffers.

Portions of an image may also be designated as regions. As used herein, an image region is a rectangular portion of a full stored digital image or frame buffer, and is specified by defining a region start location, a region horizontal size, and a region vertical size. By also taking into account the stride of the full image or frame buffer, the data for a particular region can be recovered from a full image through routine mathematical calculations. It will be appreciated that regions can be used to delineate just selected areas of source images to be reduced, enlarged, or copied. Regions are also useful for storing image scaling results to partial areas of destination frame buffers in memory.

It will also be appreciated that there are many standard pixel formats that are commonly used in computer graphics systems. Four of the more common are listed below:

αRGB32: where the pixel is represented in 32 bits.

YCbCr (4:2:2): where groups of two pixels are represented in 32 bits. For the YCbCr pixel format, two separate files and/or two separate memory buffers are used to store this image data, one for the luminance ("Y") data portion of the image, and one for the chrominance ("CbCr" or "UV") data.

RGB16: where each pixel is represented completely and indivisibly by 16 bits. The entire image data content is contained in a single contiguous file or memory buffer for RGB16.

LUT8: where higher resolution pixel values (e.g., RGB16) are represented with 8 bits via a 256-entry Look-Up Table.

Typically, a graphical image scaler consistent with the invention is configurable to operate on multiple pixel formats. In some implementations, however, only a single pixel format may be supported.

It will be appreciated that a wide variety of other graphical image conventions may be utilized, and as such, the implementation of graphics controller 38, and of the graphic image scaler 56 therein, may vary to accommodate different conventions. Thus, the invention is not limited to the particular implementations discussed herein.

As noted above, graphic image scaler provides an image scaling method that uses relatively small line buffers while still being capable of processing arbitrarily large images, where the small line buffers serve to substantially reduce the circuit counts and physical sizes of graphics intensive electronics products, thereby reducing their cost and power consumption/dissipation. FIGS. 5–8 generally illustrate exemplary implementations of the primary components in image scaler 56, including the memory read unit 62 (FIG. 5), the horizontal filter unit 66 (FIG. 6), the vertical filter unit 68 (FIG. 7), and the memory write unit 70 (FIG. 8). It should be noted that no edge enhancement functionality is provided in the implementation of FIGS. 5–8, although such functionality may be included if so desired.

To support the generation of a contiguous image between scaled partitions, graphic image scaler 56 supports the concept of a partition boundary save (PSave) control state that enacts the saving or storing of the content of certain registers/memory elements in the image scaler at the right side of a given partition (i.e., the boundary between the partition and an adjacent, next partition). These saved contents are then restored at the left side of each line of the next partition (i.e., the partition beginning) and completely define the next partition's "beginning" of line state. These saved contents are referred to as partition boundary conditions. This partition boundary save state is activated at the completion of the last line of a partition when the end of the vertical filter line buffer has been reached. That is, when the last pixel of the last line of the partition has been generated by both the horizontal and vertical filters in concert. This occurs when the vertical filter's LBuf_Count equals the line buffer width, and the last VF_Final_Pixel is validly generated that cycle. When the Line Buffer count register (LBuf_Count) equals the line buffer width (a fixed constant), the "End_of-_Line" state occurs, and when this happens when the "Last Line" state is active, the PSave event is triggered. An additional signal, PSave_Set, is also asserted one cycle immediately preceding the PSave state.

Image scaler 56 also supports the concept of a partition boundary restore (PRestore) control state that enacts the restoration/loading of the partition boundary conditions to their associated registers at the beginning of each line of the current partition (after the partition has been switched from the previous partition following the most recent partition save state). The net effect of saving and restoring partition boundary conditions is that the image scaler is effectively initialized during image scaling of a current partition to a state that would occur were image scaling performed jointly on the current partition and its adjacent, preceding partition.

Figure 5:
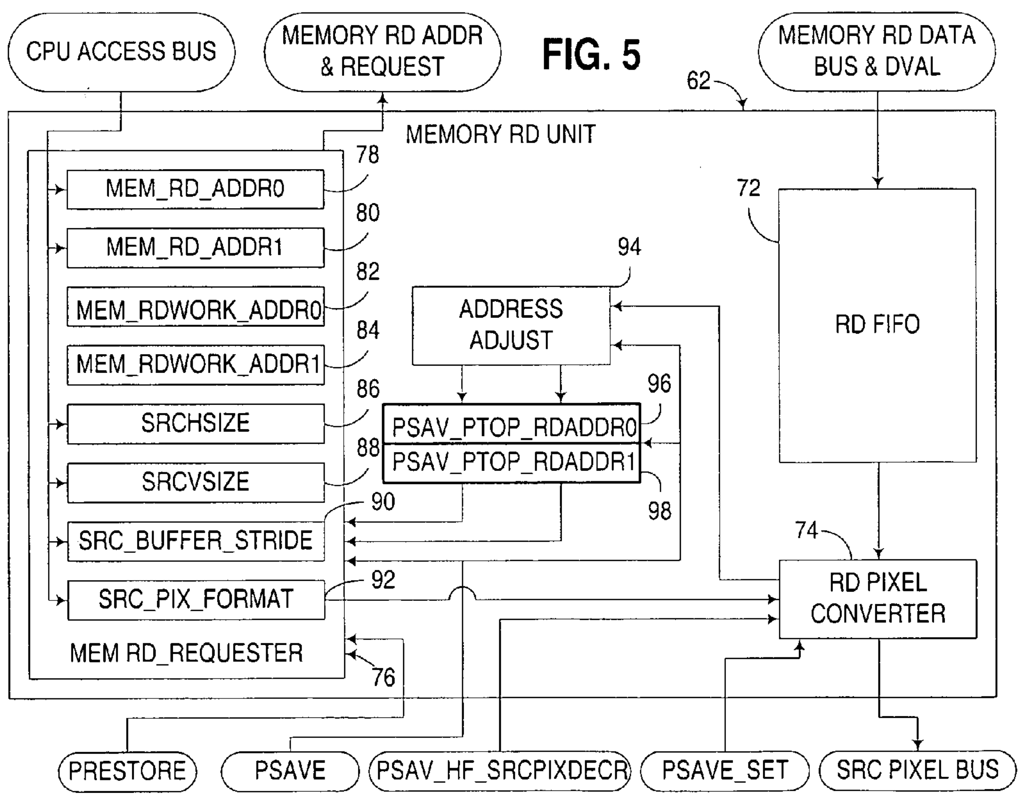
FIG. 5 is a block diagram of the memory read unit referenced in FIG. 4.

Now turning specifically to FIG. 5, memory read unit 62 includes a read FIFO 72 that receives read data and a valid data (DVAL) signal from the memory bus and outputs to a read pixel converter 74 to output source pixel data to a source pixel bus. A memory read requester 76 issues memory read addresses and requests over the memory bus.

Converter 74 receives a pixel format from memory read requester 76. Read pixel converter 74 is additionally responsive to a PSave_Set signal and a PSav_HF_SrcPixDecr signal, both of which are further described below.

There are two logical memory read data paths: RD Path0 and RD Path1, with associated Mem_RD_Addr0 and Mem-_RD_Addr1 registers 78, 80 and MemRDWork_Addr0 and MemRDWork_Addr1 registers 82, 84. For RGB16, RGB32, and LUT8 pixel formats, only a single buffer is needed and used, and thus only RD Path0 is used. For the YCbCr pixel format, RD Path0 is used for luminance data fetching, while RD Path 1 is used for chrominance data fetching.

Additional registers in unit 62 (registers 86, 88, 90 and 92) respectively store source region horizontal size (SrcHSize), source region vertical size (SrcVSize), source buffer stride (Src_Buffer_Stride), and source pixel format (Src_Pix_Format). Application code running on a CPU is capable of programming any or all of registers 78, 80, 96, 88, 90 and 92 via the CPU access bus.

In order to initialize the memory read unit at the beginning of each partition, the beginning address for each partition is stored in PSav_Ptop_RDAddr0 and PSav_Ptop_RDAddr1 registers 96, 98 under the control of an address adjust block 94, which is additionally coupled to read pixel converter 74. Registers 96, 98 are written to during a partition boundary save (signaled by PSave), and are read from during a partition boundary restore (signaled by PRestore) performed at the beginning of a new partition to initialize the Mem-_RD_Addr0 and Mem_RD_Addr1 registers 78, 80. For subsequent lines of a partition, registers 78, 80 are incremented by the source buffer stride at each partition boundary restore.

Figure 6:
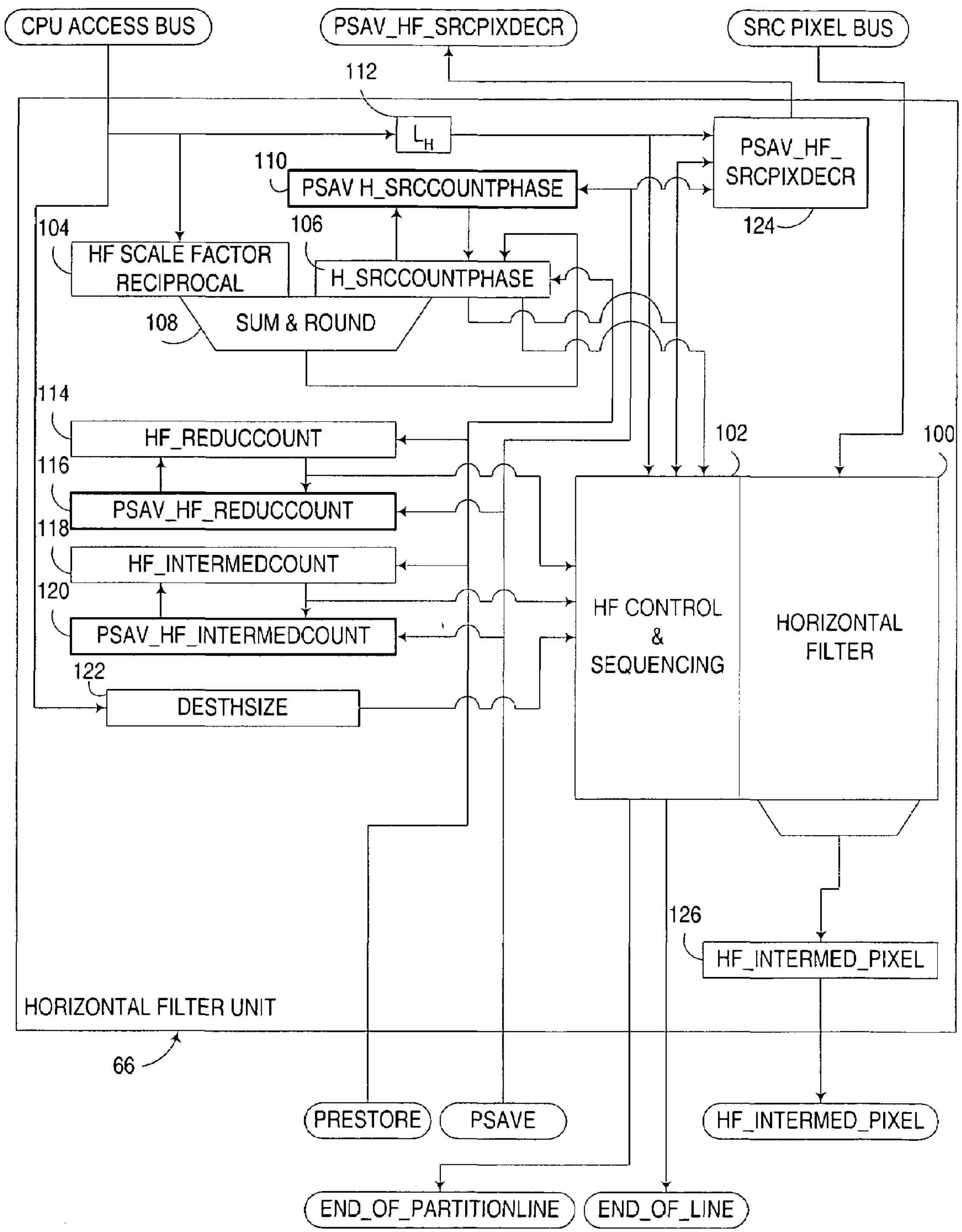
FIG. 6 is a block diagram of the horizontal filter unit referenced in FIG. 4.

FIG. 6 next illustrates horizontal filter unit 66 in greater detail. Unit 66 includes a horizontal filter 100 driven by a control and sequencing block 102. Filter 100 receives source pixels from the source pixel bus, and outputs intermediate pixels (representing horizontally-scaled pixels) to an HF_Intermed_Pixel register 126. Filter 100 may be implemented in a number of manners, e.g., as a 7-input symmetric non-linear filter including over sampling, input selection, multiplier, addition and normalization elements.

One straightforward mechanism for controlling and sequencing the horizontal filter is to define a source region horizontal pixel counter, labeled H_SrcCountPhase register 106, including its associated fractional phase part. The H_SrcCountPhase register's "count", or whole number, part is used for locating the next center-tap source pixel in the current source partition line that will be used to produce the next HF Intermediate pixel. The increment to this count and phase counter is based on the Horizontal Scale Factor, but is supplied to the scaler hardware (in register 104) in reciprocal form called the scale factor reciprocal. The reciprocal is fed along with the value in register 106 to a sum and round block 108 to update register 106.

Also provided in unit 66 is a HF_ReducCount register 114, used to count input pixels during reduction scaling, and a HF_IntermedCount register 118, used as a horizontal output counter that is compared to the DestHSize value stored in register 122 during processing of a last partition. In connection with boundary saves and restores, the registers 106, 114 and 118 are coupled to corresponding PSav registers 110, 116 and 120.

In the illustrated implementation, the hardware graphic image scaler employs an input pixel counter, while the scale factor is defined as an output pixel per input pixel ratio. For expansion in the horizontal dimension each source region pixel contributes to generating more than one destination region pixel (for example, if H_ScaleFactor=5/4, every 4 Source Region pixels produces 5 Destination Region pixels). Hence if the horizontal filter is designed to generate one pixel per cycle, for expansions there are cycles where it uses the same set of 7 Source pixels it already has (for the current HF Intermed pixel) to yield the next HF Intermed pixel.

In general, horizontal scaling incorporates initializing the H_SrcCountPhase register to zero at the beginning of a scale task the source image, and the HF_ScaleFactorReciprocal is added to the H_SrcCountPhase register, generating a sum where the count part controls when a new source pixel is accepted from the memory read unit's format converter, and the phase part is used for instantaneously selecting the center input of the Horizontal Filter from the LH-oversampled input pixels.

Unit 66 also includes a PSav_HF_SrcPixDecr block 124 that receives as input the value of $L_H$ stored in register 112 (which, along with registers 114 and 118, is programmable via the CPU access bus) along with H_SrcCountPhase and H_SrcCountPhase_sum. Block 124 is used to generate a PSav_HF_SrcPixDecr signal to drive read pixel converter 74 (FIG. 5). The PSav_HF_SrcPixDecr signal is a desirable adjustment to the first pixel location specified as the Beginning-of-Line of a new Partition being defined at a boundary save condition. This adjustment back to the left is needed to preserve the continuity of the destination image being produced, since the horizontal filter requires multiple inputs, including preceding pixels to the nominal center-tap pixel pointed to by the H_SrcCountPhase register value. The PSav_HF_SrcPixDecr value is calculated in block 124 during a boundary save from the contents of registers 106 and 112.

Figure 7:
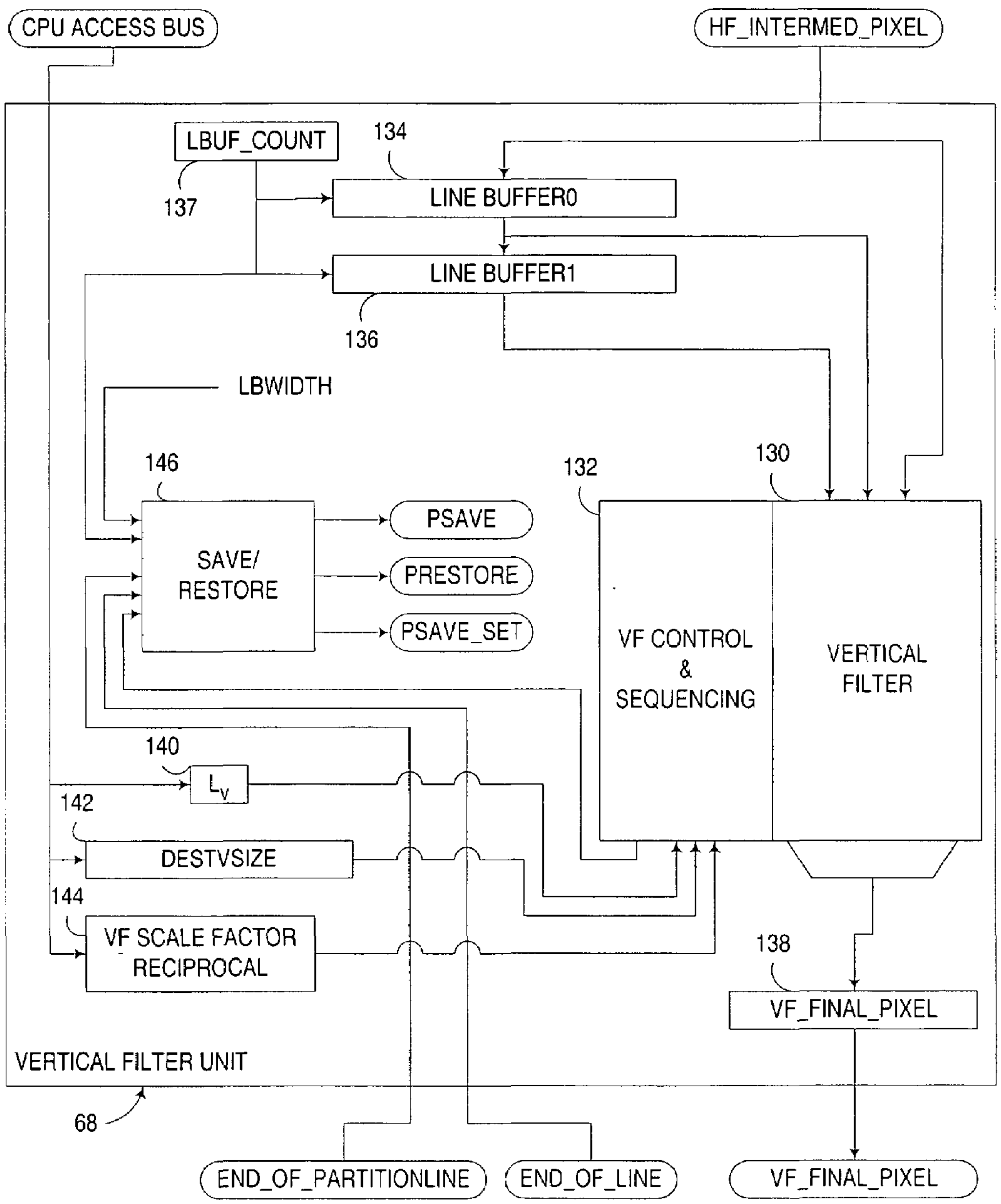
FIG. 7 is a block diagram of the vertical filter unit referenced in FIG. 4.

FIG. 7 next illustrates vertical filter unit 68 in greater detail. Unit 68 includes a vertical filter 130 driven by a control and sequencing block 132. Filter 130 receives intermediate pixels from the HF_Intermed_Pixel register 126, and outputs final pixels (representing horizontally and vertically scaled pixels) to a VF_Final_Pixel register 138. Filter 130 may be implemented in a number of manners, e.g., as a 3-input symmetric non-linear filter including over sampling, input selection, multiplier, addition and normalization elements.

Filter 130 typically requires N−1 Line Buffers for an N-tap vertical filter. For the implementation shown in FIG. 7, where N=3, N−1 or two line buffers 134, 136 are required. Line buffer 134 stores HF Intermediate Pixel data directly from register 126, and line buffer 136 stores the pixel data output by line buffer 134. As such, filter 130 receives three sequential lines of pixel data output from horizontal filter unit 66.

A LBuf_Count register 137 directly addresses the read and write ports of line buffers 134, 136 at all times. The output of line buffer 134 is connected to the center input of the vertical filter's selection and routing logic, while the output of line buffer 136 is connected to the "preceding line" input and the direct HF Intermed pixel bus is connected to the "following line" input.

Control and sequencing block 132 receives as input the values of $L_V$, DestVSize and the VF_Scale_Factor_Reciprocal, which are respectively stored in CPU-programmable registers 140, 142 and 144. Block 132 in turn outputs to a Save/Restore block 146, which is used to generate the PSave, PRestore, and PSave_Set signals that initiate boundary partition saves and restores. Block 132 also receives End-of-PartitionLine and End-of-Line signals from the horizontal control and sequencing block 102, which respectively indicate the end of a partition line, and the end of a destination line (irrespective of partition), the latter of which will only be asserted during processing of the last partition.

FIG. 8 next illustrates memory write unit 70, which is similar in many respects to unit 62. Unit 70 includes a write pixel converter 150 that converts VF_Final_Pixel data to a desired output format (specified by programmable register 170), and outputs such converted data to a write FLFO 152, which in turn outputs the data to the memory bus. A memory write requester 154 issues memory write addresses and requests over the memory bus.

As with unit 62, there are two logical memory write data paths: WR Path0 and WR Path1, with associated Mem_WR_Addr0 and Mem_WR_Addr1 registers 156, 158, MemWRWork_Addr0 and MemWRWork_Addr1 registers 160, 162, and PSav_PTop_WRAddr0 and PSav_PTop_WRAddr1 registers 174, 176. Additional registers in unit 70 (registers 168 and 170) respectively store destination buffer stride (Dest_Buffer_Stride) and destination pixel format (Dest_Pix_Format). Application code running on a CPU is capable of programming any or all of registers 156, 158, 168 and 170 via the CPU access bus.

In order to initialize the memory write unit at the beginning of each partition, the beginning address for each partition is stored in PSav_Ptop_WRAddr0 and PSav_Ptop_WRAddr1 registers 174, 176. Registers 174, 176 are written to during a partition boundary save (signaled by PSave), and are read from during a partition boundary restore (signaled by PRestore) performed at the beginning of a new partition to initialize the Mem_WR_Addr0 and Mem_WR_Addr1 registers 156, 158. For subsequent lines of a partition, registers 156, 158 are incremented by the destination buffer stride at each partition boundary restore.

Returning to FIG. 7, image scaler 56 defines a Line Buffer Width (LBWidth) that is smaller than the largest image that could be processed by the system. This LBWidth can be substantially smaller than the largest image width, for instance it could be limited to a width of only 64 pixels (or less) of a line of an image or region, when the largest image in the system may be 4096 pixels wide per line, or larger. The Line Buffer Width is typically fixed for a given integrated circuit implementation of the image scaler.

Consistent with the invention, a destination region of each scale task is partitioned into vertical strips, referred to as partitions. The width of each strip is the partition width, which is the number of pixels that are processed by the graphic image scaler per partition, and the LBWidth governs this partition width. The vertical height of each partition is typically the full height of the full destination region, which is referred to as the DestVSize. The LBWidth also determines the number of partitions, P, which are required to perform a given scale task. Lastly, each line of a given partition is termed a partition line, which is limited in number of pixels to the current partition width, as contrasted to the destination region's full width.

The partition width of each destination partition, with the exception of the last, is typically equal to LBWidth. For the last destination partition, the width can generally be represented as [DestHSize−(LBWidth*(P−1))].

The source partition width, on the other hand is typically limited by the horizontal filter unit and the memory read unit's read pixel converter to contain only enough source region pixels to satisfy generation of the destination partition width's number of vertical filter final pixels. The horizontal scale factor reciprocal can be used to determine this limit. This read limiting makes a PSav_PTop RD_Addr0/1 register 96, 98 adjustment and other details (End-of-Line detection) simpler. In the illustrated implementation, the limited read amount is principally based on:

[H_ScaleFactRecip*LBWidth] for all but the last partition, and

[SrcHSize-(H_ScaleFactRecip*LBWidth*(P−1))] for the last partition.

Slight additions to the above may be needed to provide extra source pixels on the left and right ends of a source partition line to satisfy the continuity requirements of the horizontal filter unit. The lefthand addition may be specified by Psav_HF_SrcPixDecr block 124 (FIG. 6), while the right hand increment is typically based solely and simply on $L_H$. Read pixel converter 74 (FIG. 5) typically translates this pixel count decrement to address adjustments for PSav_PTop_RDAddr0/1 registers 96, 98.

The PSav_HF_SrcPixDecr value is an adjustment to the first pixel location specified as the beginning-of-line of the new partition being defined at a PSave state (discussed below). This adjustment back to the left is typically needed to preserve the continuity of the destination image being produced, since the horizontal filter requires multiple inputs, including preceding pixels to the nominal center-tap pixel pointed to by a H_SrcCountPhase register 106. The PSav_HF_SrcPixDecr value (also referred to herein as a horizontal pixel decrement value) is calculated at PSave state from the contents of the H_SrcCountPhase and $L_H$.

In this context, the Beginning-of-PartitionLine refers to the first pixel of the current partition line, whether it is a source or destination partition line. The End-of-PartitionLine refers to the last pixel of the current partition line. The LastVFLine refers to the state of producing the ultimate last line of vertical filter final pixel data of the current partition. This is in contrast to the last source region line, or the last HF_Intermed_Pixel line, which may not necessarily immediately produce the last destination region line, if the scale task involves expansion in the vertical dimension.

Thus, as illustrated in FIGS. 5–8, the registers that are stored at a partition boundary save and restored at a partition boundary restore are:

PSav_PTop_RDAddr0 and PSav_PTop_RDAddr1 registers 96, 98 (FIG. 5)—top of partition, or partition read start addresses. Note that these registers are not restored to the Mem_RDAddr0/1 registers 78, 80 at every PRestore time, but are used to locate the next partition's start address(es) at this partition's PSave state. The Mem_RDAddr0 & 1 registers 78, 80 are incremented by the respective Src_Buffer_Stride amount at each PRestore time of a current partition to define the next partition line's beginning in system memory.

PSav_H_SrcCountPhase register 110—horizontal pixel count and/or phase. This stores the H_SrcCountPhase value to produce the first pixel of the next partition at PSave state activation time. Then at each PRestore time of a current partition, PSav_H_SrcCountPhase is reloaded into H_SrcCountPhase register 106 to start each Beginning-of-PartitionLine with the correct horizontal count & phase to preserve the continuity of the destination image between partitions.

PSav_HF_ReducCount register 116—horizontal filter reduction count. This is saved to preserve horizontal continuity.

PSav_HF_IntermedCount register 120—horizontal filter output count. This is saved to preserve continuity and to flag an end-of-line condition.

PSav_PTop_WRAddr0 and PSav_PTop_WRAddr1 registers 174, 176—top of partition, or partition write start addresses. These are used similarly to the PSav_PTop_RDAddr0/1 registers above, but for memory write addresses.

The above PSav registers generally define the beginning boundary conditions for all scaler units and elements. It has been found that these additional silicon/hardware resources may use 7000 to 10,000 CMOS ASIC standard cells; however, about 400,000 cells may be saved from the smaller line buffers enabled solely by the invention (e.g., when 64 pixel line buffers are used in lieu of 4096 pixel line buffers). It will also be appreciated that other combinations of boundary save conditions may be stored and restored in other embodiments. For example, other conditions such as other read/write addressing, FIFO, and pixel formatting values; alignment, enable, and overfetching values; edge enhancement values (e.g., edge enhancement pixel counts and phases); multiplexer select values, etc., may also be maintained as boundary save conditions.

It will be appreciated that implementation of the aforementioned units and the other functionality described herein in an integrated circuit device would be well within the abilities of one of ordinary skill in the art having the benefit of the instant disclosure.

FIG. 9 next illustrates a scale image routine 200 that describes the operation of image scaler 56 in scaling an image in a manner consistent with the invention. Routine 200 begins in block 202 by programming the image scaler, typically via software such as a graphics application or a device driver executing on the device CPU. In connection with such programming, suitable values for the CPU-accessible registers are generated and written into the appropriate registers. Moreover, the image scaler is started via software control (e.g., via a command) once the programmable registers have been suitably programmed.

Next, as shown in block 204, all PSav counters and registers are initialized. The PSav counters (stored in registers 110, 116 and 120) are initialized to zero, while the PSav registers (registers 96, 98, 174 and 176) are set to beginning addresses (i.e., the addresses corresponding to the top left corners) for the source and destination regions.

Thereafter, control passes to block 206 to initiate processing of partition line pixels. Given the parallelism supported by image scaler 56, each unit 62, 66, 68 and 70 operates in parallel to process pixels in a given partition line. In particular, memory read unit 62 generates read requests to retrieve source image pixels for a given partition line, and performs appropriate pixel format conversion. Unit 62 also endeavors to keep horizontal filter unit 66 supplied with converted pixel data. The work registers, in particular, are incremented by a transfer length after each request.

Also, horizontal filter unit 66 controls the acceptance of pixel data from the memory read unit, performs arithmetic filtering operations and controls validation of HF_Intermed pixel data. Furthermore, the horizontal filter unit detects and signals End-of-PartitionLine and End-of-Line conditions.

The vertical filter unit 68 controls the acceptance of HF_Intermed pixel data from the horizontal filter unit, and performs arithmetic filtering operations to generate VF_Final pixel data. The vertical filter unit also detects and signals the destination region Last VF_Line.

The memory write unit converts VF_Final pixel data to the desired destination format, and supplies the write FIFO with suitable data for output. Moreover, the memory write unit generates write requests to store the final data in the destination image memory buffer.

Turning now to block 208, processing of partition line pixels continues until an End-of-PartitionLine or End-of-Line is detected. When either condition is detected, control passes to block 210 to determine if this is the last vertical filter line for the partition. If not, control passes to block 212 to perform a PRestore, and then on to block 206 to continue processing the partition pixel data on the next partition line.

Otherwise, if Last VF_Line is detected, block 210 passes control to block 214, which determines whether the destination region end-of-line has been reached (indicating the last partition has been completed). If not, control passes to block 216 to perform a PSav operation, and then to block 214 to do a PRestore operation for the first line of the next partition. Otherwise, if the last partition is complete, block 214 simply terminates routine 200.

It will be appreciated that implementation of routine 200 in application/device driver software, along with implementation of appropriate state machines in image scaler 56, would be well within the abilities of one of ordinary skill in the art having the benefit of the instant disclosure. Moreover, a wide variety of alternate image scaling algorithms and circuitry may be used in the alternative. As such, the invention is not limited to the particular implementation discussed herein.

Working Example

Figure 10:
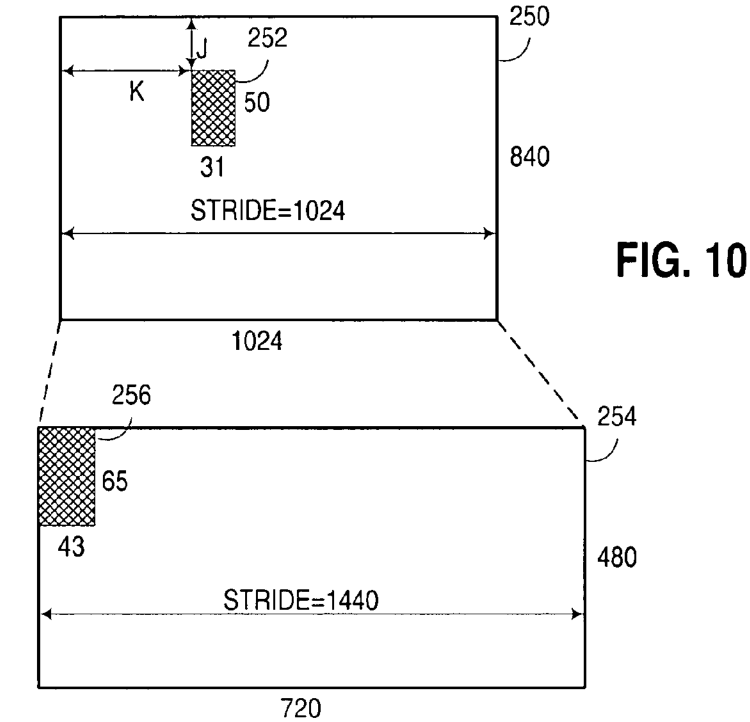
FIG. 10 is a block diagram illustrating an exemplary image scaling operation performed by the graphics controller of FIG. 3.
Figure 11:
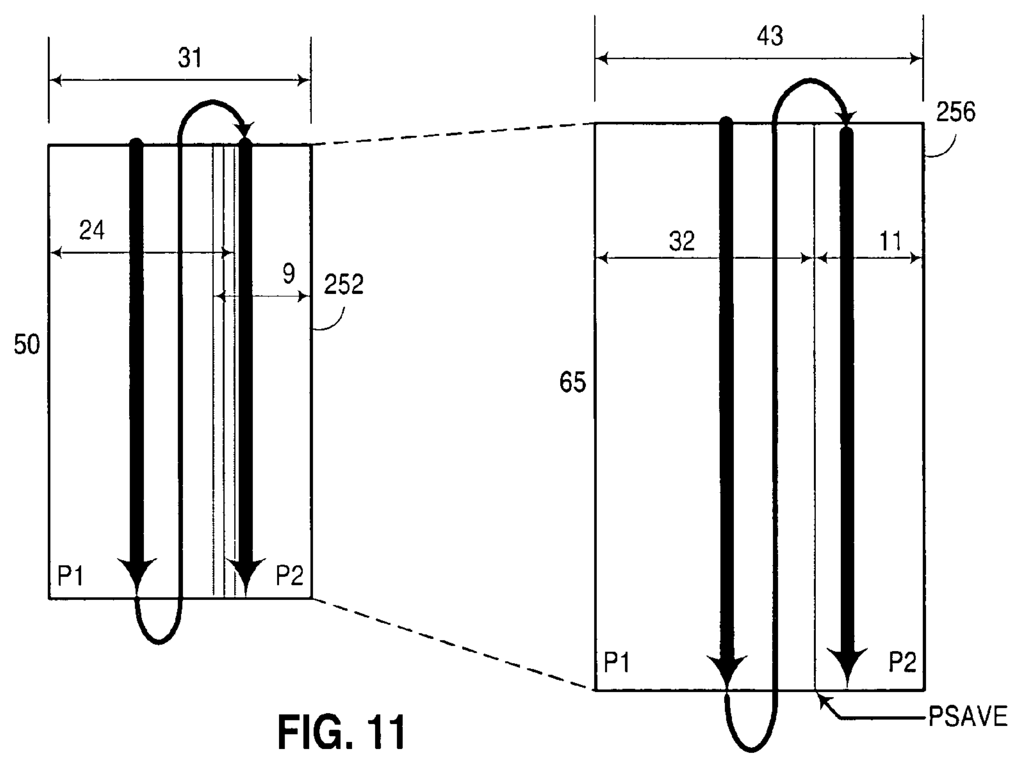
FIG. 11 is a block diagram illustrating the source and destination regions referenced in FIG. 10.

FIGS. 10 and 11 illustrate an exemplary image scaling operation performed on an exemplary source image using the partitioning in the manner described herein. This example assumes a Line Buffer Width (LBWidth)=32 pixels, which is a fixed aspect of a given design.

As shown in FIG. 10, the source image memory buffer 250 has a size of 1024×840 pixels. It is a YUV buffer with separate Y & UV areas, each of which has 840 lines of 1024 bytes per line. There are 2 bytes per pixel on average. The source image region 252 has a width of 31 pixels and height of 50 pixels, and is offset from the origin of the source image memory buffer 250 by j lines vertically and k pixels horizontally. This is so in both the Y and UV areas of the buffer. As such, the following source image parameters exist:

SrcHSize=31 pixels

SrcVSize=50 lines

Src_Pix_Format=YUV

Src_Buffer_Stride=1024

MemRDAddr0=YSrcRegionStartAddr=SrcYOrigin+(1024j)+k

MemRDAddr1=UVSrcRegionStartAddr=SrcUVOrigin+(1024j)+k

The destination image memory buffer 254 has a size of 720×480 pixels. It is a RGB16 buffer with 2 contiguous bytes per pixel, thus resulting in 480 lines of 1440 bytes per line. A destination image region 256 is defined with a width of 43 pixels and a height of 65 pixels, and is not offset from the destination image memory buffer origin. As such, the following destination image parameters exist:

DestHSize=43 pixels

DestVSize=65 lines

Dest_Pix_Format=YUV

Dest_Buffer_Stride=1440

MemWRAddr0=RGB16_DestRegionStartAddr=DestOrigin

The scale factors between the source and destination image regions are as follows:

H_ScaleFactor=43/31=1.387~4/3 (Direct region dimensions)

$L_H$=4

V_ScaleFactor=4/3=1.333 (SW chosen to be close to H_ScaleFactor);

$L_v$=4

In addition, LBWidth determines the Dest_Partition_Width, which governs the number of HF & thus VF pixels generated per PartitionLine. The Dest_Partition_Width is not determined by the Memory RD Unit's RD Requester.

This example, with a destination region width of 43 pixels, requires two partitions to complete the scale task.

As shown in FIG. 11, the first partition P1 is characterized by reading 24 source pixels and generating 32 HF_Intermed pixels for each of the 50 source lines. The 50 HF_Intermed lines are expanded by the vertical filter to 65 lines of 32 Final pixels per line. A PSave partition boundary save occurs at the end of P1. The second partition P2 consists of reading 9 pixels per line (i.e., [SrcHSize-(H_ScaleFactRecip*LBWidth*(P−1))+PSav_HFPixCnt-Decr]=31−24+2=9) and generating 11 HF_Intermed pixels per line for each of the 50 source lines. The 50 HF_Intermed pixel lines are expanded by the vertical filter to 65 lines of 11 Final pixels per line.

In this example, the memory read unit's read requester is limited by the horizontal filter and RD pixel converter to reading only just enough source data to generate a number of HF_Intermed (and thus VF_Final) pixels equal to either:

a) LBWidth, for partitions that are not the last, or b) [DestHSize−(LBWidth*(P−1))] for the last partition, where P is the number of partitions to complete the scale task.

Furthermore, in this example, it is assumed that the source pixels in each line of each partition are designated as s0 . . . sN, the HF_Intermed pixels in each line are designated as i0 . . . iN, and the VF_Final pixels in each line are designated as f0 . . . fN.

Example Walk-Through

A. Initialization

First, the scale task parameters are determined and programmed into the graphic image scaler's CPU-Access registers. At the Start/Busy signal rise, the PSave registers are initialized, as follows:

PSav_PTop_RD_Addr0/1 copy initial Mem_RD_Addr0/1

PSav_H_SrcCountPhase=0

PSav_HF_ReducCount=0

Psav_HF_IntermedCount=0

PSav_PTop_WR_Addr0/1 copy initial Mem_WR_Addr0/1

B. Scaling of First Partition

During scaling of the first partition, each unit of the image scaler operates as follows:

1. Memory Read Unlit—reads Y & UV data separately, reading enough data per line such that the horizontal filter can generate 32 HF_Intermed_Pixels. Addressing for read requests is generated via MemRDWorkAddr0/1 and MemRDAddr0/1 registers. The horizontal filter and read pixel converter prevent the read requester from reading too much data, and the read pixel converter provides exactly 24 source pixels per line to the horizontal filter converted from YUV to RGB24. Hence, the read requester reads no less than 24 bytes of Y & 24 bytes of UV data per line. This process continues until 50 lines each of Y & UV data are read.

2. Horizontal Filter—expands the 24 source pixels into 32 HF_Intermed Pixels for every line. For each HF pixel generated, H_SrcCountPhase, HF_IntermedCount, HF_ReducCount, & LBuf_Count are updated. When the End-of-PartitionLine is reached for each line, the horizontal filter activates the PRestore state, causing the following to occur:

PRestore wait state(s) signaled to the read pixel converter.

MemRDAddr0 & 1 are loaded with [MemRDAddr0/1+Src_Buffer_Stride] respectively, which is also copied to MemRDWorkAddr0 and 1 registers.

read FIFO is cleared (i.e. reset-flushed).

H_SrcCountPhase, HF_IntermedCount & HF_ReducCount are loaded from their PSave counterparts (which are all zero for 1st Partition).

LBufCount is cleared to zero.

3. Vertical Filter—expands 50 lines of source pixel data to 65 lines of VF_Final Pixel data. The number of VF Final pixels per first partition line is unchanged from that generated by the horizontal filter (i.e., 32), but the values are the result of vertically filtering the HF_Intermed pixel values. As the horizontal filter generates and latches the HF_Intermed pixel(s), the vertical filter generates its VF_Final pixel(s) for matching horizontal location(s) 1 cycle later. It will be appreciated that, in some embodiments, the horizontal and vertical filters may be implemented with parallelism, thereby producing more than one pixel per cycle.

4. Memory Write Unit—writes RGB16 data to the destination image region in memory:

write pixel converter converts each of the 32 RGB24 VF_Final Pixels per line to the destination format of RGB16, then stores them in the write FIFO. At 2 bytes per pixel, this is 64 bytes per first partition line.

write requester writes the destination RGB16 data to the destination image region; addressed with the use of MemWRAddr0 and MemWRWorkAddr0 registers.

At End-of-PartitionLine (PRestore) occurences, write requester forces the emptying of write FIFO to the destination image region and, when complete, points to the next line of the destination image region by loading MemWRAddr0 with [MemWRAddr0+Dest_Buffer_Stride].

65 lines of RGB16 data are written to the destination image region.

C. PSave Partition Boundary Save

The PSave_Set condition activates when the last pixel is generated at the End-of-PartitionLine of the Last VF_Line. In the current example, PSave_Set activates when the vertical filter is generating the 32nd pixel of the 65th VF Line.

Next, the PSAVE_SET condition instigates the following actions:

PSav_Wait is activated to the memory read unit to prevent the read pixel converter from indeterminately going ahead to new source pixels which the horizontal filter hasn't used nor accounted for.

The PSave state is set active ("1") at the end of the cycle.

All operations associated with the last pixel of the End-of-PartitionLine of the Last VF_Line are allowed to complete, including the incremental updates of H_SrcCountPhase, HF_ReducCount, and HF_IntermedCount.

The PRestore state which usually Occurs at the End-of-PartitionLine and its associated operations, are suppressed.

Next, once the PSave state is active/set, the following actions occur:

Hold all horizontal and vertical filter pixel operations, yet allow the last pixel(s) of the currently ending partition to be stored via the memory write unit into the correct location in the destination image region in system memory.

Copy the contents of the H_SrcCountPhase, HF_ReducCount, and HF_IntermedCount registers to their respective PSav-register counterparts. These are now updated for the first pixel in the next partition. For this example, the PSav register values for the second partition's Beginning-of-PartitionLine are PSav_H_SrcCountPhase=23.0610, PSav_HF_ReducCount=23, and PSav_HF_IntermedCount=32.

Adjust the Y-buffer read address "delta" and add this to the PSav_PTop_RDAddr0 register, and do likewise for PSav_PTop_RDAddr1 (UV) register. The adjustment is performed using PSav_HF_PixCntDecr, the read pixel converter's unused pixel count and source pixel format information, and the difference [MemRDWorkAddr0–MemRDAdd0]; likewise for Addr1 registers.

Memory write unit saves PSav_PTop_WRAddr0 register after all first partition data has been written to memory. Only PSav_PTop_WRAddr0 is needed in this example, since the destination pixel format is RGB16, which consists of indivisible 2-bytes-per-pixel data that reside all in a single contiguous memory buffer.

PSav_HF_PixCntDecr and associated RD address "delta" and PSav_PTop values are generated to ensure continuity between partitions. During the generation of the last HF Intermed Pixel of each PartitionLine of the first partition, H_SrcCountPhase=22.3510, and the horizontal filter requires three source pixels (e.g., pixels s21, s22, & s23) to make the last intermediate pixel i31 (due to $L_H$=4, i.e. 4× oversampling). Note that s23 is needed even though the HF's center input is s22 (as specified by the H_SrcCount=22 above) since the 7th input to the HF must come from the pixel following s22. The 22.34 is converted to 22.25 (rounded the nearest quarter since $L_H$=4), which corresponds to the second position of s22 in the oversampled space.

When producing the first HF_Intermed pixel (i32) of each PartitionLine of the second partition, PSav_H_SrcCountPhase=23.07 (23+0/4 when rounded), which is copied to H_SrcCountPhase. This means that the horizontal filter's center input is routed from the first position of s23 in oversampled space. Accordingly, the leftmost three inputs (1st, 2nd, & 3rd inputs) of the horizontal filter must originate from the directly preceding source pixel, s22. Hence, at PSave time, the memory read unit must be decremented from pointing at s24 (i.e. the next source pixel that was not yet sent to the horizontal filter unit) to point to s22, for all partition line beginnings of the second partition. Thus, the PSav_HF_SrcPixDecr=2=24–22. The horizontal filter calculates this source pixel-number decrement based on $L_H$, and the H_SrcCountPhase and H_SrcCountPhase_sum at the End-of-PartitionLine of the first partition.

To arrive at the PSav_PTop_RDAddr0 & 1 values saved at the end of the first partition, it is important to note that for YUV there are 2 separate buffers and each buffer exhibits 1 byte/pixel. Also note that at the End-of-PartitionLine for the Last VF_Line, the difference between the Mem_RDAddr0 and Mem_RDWorkAddr0 is 24 bytes, and likewise for Mem_RDAddr1 and Mem_RDWorkAddr1. Hence, PSav_PTop_RDAddr0=PSav_PTop_RDAddr0+24−2=[SrcYOrigin+1024j+k]+22. Similarly, PSav_PTop_RDAddr1=PSav_PTop_RDAddr1+24−2=[SrcUVOrigin+1024j+k]+22.

D. Scaling of Second Partition

During scaling of the second partition, each unit of the image scaler operates as follows:

1. Memory Read Unit—reads Y & UV data separately, reading at least nine bytes of Y data, and at least ten bytes of UV data (five UV pairs). In addition, the read pixel converter provides exactly nine source pixels to the horizontal filter converted from YUV to RGB24, starting with Source pixel s22. Moreover, 50 lines each of Y & UV data are read.

2. Horizontal Filter Unit—expands the nine source pixels into eleven HF_Intermed pixels for every partition line. For each horizontal filter pixel generated, H_SrcCountPhase, HF_IntermedCount, HF_ReducCount, & LBUF_COUNT are updated. Moreover, when the End-of-PartitionLine is reached, it is also the scale task's End-of-Line, yet still the vertical filter unit activates the PRestore state, causing tile following to occur:

- PRestore wait state(s) signaled to the read pixel converter.
- MemRDAddr0 & 1 are loaded with [MemRDAddr0/1+Src_Buffer_Stride] respectively, and these are also copied to MemRDWorkAddr0 and 1 registers.
- Read FIFO is cleared (i.e. Reset-flushed).
- H_SrcCountPhase, HF_IntermedCount & HF_ReducCount are loaded from their PSave counterparts (which are all non-zero for the second partition)
- LBUF_COUNT is cleared to zero.

3. Vertical Filter Unit—expands 50 partition lines of source pixel data to 65 partition lines of VF_Final pixel data for the second partition. Each partition line consists of eleven VF_Final pixels.

4. Memory Write Unit—writes RGB16 data to the destination image region in memory, including:

- Convert each of the eleven RGB24 VF_Final Pixels per partition line to the destination format of RGB16 in the write pixel converter, then storing them in the write FIFO. At 2 bytes per pixel, this is 22 bytes per second partition line.
- Writes the destination RGB16 data to the destination image region, addressed with the use of MemWRAddr0 and MemWRWorkAddr0 registers.
- At End-of-PartitionLine occurrences (also End-of-Lines), force the emptying of the write FIFO to the destination image region and, when complete, point to the next line of the destination image region by loading MemWRAddr0 with [MemWRAddr0+Dest_Buffer_Stride].
- Write 65 partition lines of RGB16 data to the destination image region.

E. Completion of Scale Task

When the End-of-Line & End-of-PartitionLine conditions occur for the Last VF_Line of the second partition, the image scaler typically quiesces the memory read unit, and the horizontal and vertical filter units, while allowing the memory write unit to complete all pixel data writes to the destination region in the destination image memory buffer in system memory. Then the image scaler ends the scale task by resetting (clearing) the start/busy bit in the Scale_Control register.

Various modifications may be made to the illustrated embodiments without departing from the spirit and scope of the invention. For example, in some embodiments, vertical filtering may be performed prior to horizontal filtering, whereby the width of the partitions prior to any horizontal scaling could be selected to be no greater than the width of the line buffer, rather than selecting the partition width based upon the resulting width of each partition after horizontal scaling. Other modifications will be appreciated by one of ordinary skill in the art having the benefit of the instant disclosure. Therefore, the invention lies in the claims hereinafter appended.

What is claimed is:

1. A circuit arrangement, comprising:

a line buffer having a width; and an image scaling circuit coupled to the line buffer and configured to generate a scaled image from a source image by partitioning the source image into a plurality of partitions and image scaling each partition using the line buffer, wherein each partition has a width that is no greater than that of the line buffer, and the scaled image has an overall width that is greater than that of the line buffer;

wherein the plurality of partitions includes first and second partitions arranged adjacent to one another in the source image, wherein the image scaling circuit is further configured to store boundary conditions for the first partition for use during image scaling of the second partition, and wherein the image scaling circuit is configured to initiate a partition boundary save operation to store the boundary conditions for the first partition upon image scaling a last line of the first partition, and to initiate a partition boundary restore operation prior to image scaling a first line of the second partition to retrieve the stored boundary conditions for use during image scaling of the second partition.

2. The circuit arrangement of claim 1, wherein the image scaling circuit is configured to initiate a partition boundary restore operation to retrieve the stored boundary conditions prior to image scaling each line of the second partition.

3. The circuit arrangement of claim 1, wherein the boundary conditions initialize the image scaling circuit during image scaling of the second partition to a state that would occur were image scaling performed jointly on the first and second partitions.

4. The circuit arrangement of claim 1, wherein the boundary conditions include at least one of a partition read start address, a partition write start address, a horizontal filter pixel count, a horizontal filter pixel phase, a horizontal filter output count, a horizontal filter reduction count, and a horizontal pixel decrement value.

5. The circuit arrangement of claim 1, wherein the image scaling circuit comprises:

a memory read unit configured to retrieve source image data from a memory;

a horizontal filter unit coupled to the memory read unit and configured to horizontally scale the source image data retrieved from the memory to generate horizontally-scaled image data;

a vertical filter unit coupled to the horizontal filter unit and configured to vertically scale the horizontally-scaled image data to generate scaled image data, wherein the line buffer is disposed in the vertical filter unit; and a memory write unit coupled to the vertical filter and configured to store the scaled image data in the memory.

6. A circuit arrangement, comprising:

a line buffer having a width;

an image scaling circuit coupled to the line buffer and configured to generate a scaled image from a source image by partitioning the source image into a plurality of partitions and image scaling each partition using the line buffer, wherein each partition has a width that is no greater than that of the line buffer, and the scaled image has an overall width that is greater than that of the line buffer, wherein the image scaling circuit comprises:

a memory read unit configured to retrieve source image data from a memory;

a horizontal filter unit coupled to the memory read unit and configured to horizontally scale the source image data retrieved from the memory to generate horizontally-scaled image data;

a vertical filter unit coupled to the horizontal filter unit and configured to vertically scale the horizontally-scaled image data to generate scaled image data, wherein the line buffer is disposed in the vertical filter unit; and a memory write unit coupled to the vertical filter and configured to store the scaled image data in the memory; and a save/restore circuit configured to initiate a partition boundary save operation upon processing of a last line of a first partition, and to initiate a partition boundary restore operation prior to processing a first line of a second partition to retrieve the stored boundary conditions for use during image scaling of the second partition.

7. The circuit arrangement of claim 5, wherein each of the memory read and write units includes a pixel format converter.

8. The circuit arrangement of claim 5, wherein each of the vertical and horizontal filter units includes a symmetric non-linear filter.

9. The circuit arrangement of claim 1, wherein the line buffer has a width less than or equal to about 512 pixels.

10. The circuit arrangement of claim 1, wherein each partition includes a plurality of lines, wherein the image scaling circuit is configured to image scale each partition by longitudinally scaling each of the plurality of lines, and wherein the width of each line of each partition is no greater than that of the line buffer alter longitudinal scaling.

11. The circuit arrangement of claim 1, wherein each partition includes a plurality of lines, wherein the image sealing circuit is configured to image scale each partition by longitudinally scaling each of the plurality of lines, and wherein the width of each line of each partition is no greater than that of the line buffer prior to longitudinal scaling.

12. An integrated circuit device comprising the circuit arrangement of claim 1.

13. An apparatus comprising the circuit arrangement of claim 1.

14. A program product, comprising a hardware definition program that defines the circuit arrangement of claim 1; and a signal bearing media bearing the hardware definition program, wherein the signal bearing media includes at least one of a transmission type media and a recordable media.

15. A method of scaling a graphical image, the method comprising:

partitioning a source image into a plurality of partitions; and image scaling each partition using the line buffer to generate a scaled image, wherein each partition has a width that is no greater than that of the line buffer, and the scaled image has an overall width that is greater than that of the line buffer;

wherein the plurality of partitions includes first and second partitions arranged adjacent to one another in the source image, wherein image scaling the first partition includes storing boundary conditions for the first partition for use during image scaling of the second partition, wherein storing boundary conditions for the first partition includes initiating a partition boundary save operation to store the boundary conditions for the first partition upon image scaling a last line of the first partition, and wherein image scaling the second partition includes initiating a partition boundary restore operation prior to image scaling a first line of the second partition to retrieve the stored boundary conditions for use during image scaling of the second partition.

16. The method of claim 15, wherein initiating the partition boundary restore operation is performed prior to image scaling each line of the second partition.

17. The method of claim 15, wherein the boundary conditions initialize an image scaling circuit that performs the image scaling during image scaling of the second partition to a state that would occur were image scaling performed jointly on the first and second partitions.

18. The method of claim 15, wherein the boundary conditions include at least one of a partition read start address, a partition write start address, a horizontal filter pixel count, a horizontal filter pixel phase, a horizontal filter output count, a horizontal filter reduction count, and a horizontal pixel decrement value used by an image scaling circuit.

19. The method of claim 15, wherein image scaling is performed by an image scaling circuit that includes:

a memory read unit configured to retrieve source image data from a memory;

a horizontal filter unit coupled to the memory read unit and configured to horizontally scale the source image data retrieved from the memory to generate horizontally-scaled image data;

a vertical filter unit coupled to the horizontal filter unit and configured to vertically scale the horizontally-scaled image data to generate scaled image data, wherein the line buffer is disposed in the vertical filter unit; and a memory write unit coupled to the vertical filter and configured to store the scaled image data in the memory.

20. A method of scaling a graphical image, the method comprising:

partitioning a source image into a plurality of partitions; and image scaling each partition using the line buffer to generate a scaled image, wherein each partition has a width that is no greater than that of the line buffer, and led image has an overall width that is greater than at of the line buffer, wherein image scaling is performed by an image scaling circuit that includes:

a memory read unit configured to retrieve source image data from a memory;

a horizontal filter unit coupled to the memory read unit and configured to horizontally scale the source image data retrieved from the memory to generate horizontally-scaled image data;

a vertical filter unit coupled to the horizontal filter unit and configured to vertically scale the horizontally-scaled image data to generate scaled image data, wherein the line buffer is disposed in the vertical filter unit;

a memory write unit coupled to the vertical filter and configured to store the scaled image data in the memory; and a save/restore circuit configured to initiate a partition boundary save operation upon processing of a last line of a first partition, and to initiate a partition boundary restore operation prior to processing a first line of a second partition to retrieve the stored boundary conditions for use during image scaling of the second partition.

21. The method of claim 15, wherein each partition includes a plurality of lines, wherein image scaling each partition includes longitudinally scaling each of the plurality of lines, and wherein the width of each line of each partition is no greater than that of the line buffer after longitudinal scaling.

22. The method of claim 15, wherein each partition includes a plurality of lines, wherein image scaling each partition includes longitudinally scaling each of the plurality of lines, and wherein the width of each line of each partition is no greater than that of the line buffer prior to longitudinal scaling.

23. A method of scaling a graphical image, the method comprising:

transferring image data for a source image from a memory to a horizontal filter such that the horizontal filter receives the image data arranged into a plurality of horizontally-arranged partitions, with each partition including a plurality of lines of image data;

horizontally scaling each line of image data in each partition using the horizontal filter to generate a plurality of horizontally-scaled lines of image data; and vertically scaling the plurality of horizontally-scaled lines of image data using a vertical filter to generate a scaled image, wherein the vertical filter includes at least one line buffer configured to store the horizontally-scaled lines of image data, and wherein each horizontally-scaled line of image data has a width that is no greater than that of the line buffer, and the overall width of the scaled image is greater than that of the line buffer;

initiating a partition boundary save operation upon processing of a last line of a first partition; and initiating a partition boundary restore operation prior to processing a first line of a second partition to retrieve the stored boundary conditions for use during image scaling of the second partition.

* * * * *